(12) United States Patent
Matsumoto et al.

(10) Patent No.: US 6,549,508 B1
(45) Date of Patent: Apr. 15, 2003

(54) TURNTABLE AND DISK DRIVING DEVICE

(75) Inventors: Yukio Matsumoto, Tokyo (JP); Satoshi Otomo, Tokyo (JP); Toshio Nakamura, Tokyo (JP)

(73) Assignee: Aiwa Co., Ltd., Tokyo (JP)

( * ) Notice: Subject to any disclaimer, the term of this patent is extended or adjusted under 35 U.S.C. 154(b) by 115 days.

(21) Appl. No.: 09/636,279

(22) Filed: Aug. 10, 2000

(30) Foreign Application Priority Data

Aug. 11, 1999 (JP) .......................................... 11-227488
Nov. 29, 1999 (JP) .......................................... 11-338016

(51) Int. Cl.$^7$ .............................................. G11B 23/00
(52) U.S. Cl. ...................................................... 369/264
(58) Field of Search ................................ 369/264, 263, 369/270

(56) References Cited

U.S. PATENT DOCUMENTS 5,241,530 A * 8/1993 Kobayashi et al. ......... 369/264
5,323,379 A * 6/1994 Kim ............................ 369/270
5,600,625 A * 2/1997 Kammerer .................. 369/270
6,359,856 B2 * 3/2002 Nguyen ...................... 369/264

FOREIGN PATENT DOCUMENTS

JP   9-265726    7/1997
JP   10-86177    7/1998

* cited by examiner

Primary Examiner—Allen Cao
(74) Attorney, Agent, or Firm—Fulbright & Jaworski L.L.P.

(57) ABSTRACT

A turntable can be manufactured inexpensively using a comparatively inexpensive material and in accordance with ordinary injection molding technique and mold management. A thin-walled cylindrical fixing portion having an insertion hole, into which a rotational shaft is pressed, is formed at a central portion of the turntable. A thin-walled cylindrical reinforcing portion, which is concentric with the fixing portion and has a large diameter, is formed at the outer circumferential side of the fixing portion. Reinforcing rib portions are provided radially between the fixing portion and the reinforcing portion. In this way, deformation due to sink or the like does not occur at the time of injection molding, and extracting force of the rotational shaft which was pressed into the insertion hole can be adjusted to a predetermined value.

13 Claims, 16 Drawing Sheets

PRESSING-IN FORCE, EXTRACTING FORCE WITH RESPECT TO SHAFT DIAMETER (TURNTABLE MANUFACTURED FROM POM)

TURNTABLE AND DISK DRIVING DEVICE

BACKGROUND OF THE INVENTION

1. Field of the Invention

The present invention relates to a turntable and a disk driving device which are used to load and rotate a disk or the like, which serves as a recording and reproducing medium of a signal.

2. Description of the Related Art

In general, a compact disk player (CD player) carries out an a operation in which a CD is loaded on a turntable which is anchored to a rotational shaft of a spindle motor, in which the spindle motor is driven, and in which a signal which was recorded by an optical pickup is reproduced while the CD is rotated together with the turntable.

In order that the turntable used in this way can reliably transmit rotational torque from the rotational shaft of the spindle motor to the CD, extracting force of the rotational shaft after the rotational shaft was pressed into and mounted to an insertion hole of the turntable is strictly set to a value within a predetermined range.

Further, in order that a recording surface of the CD which is loaded and rotated on the turntable does not vibrate, a CD loading surface of the turntable is strictly set so as to be perpendicular to the rotational shaft of the spindle motor (preventing a so-called surface vibration).

Conventionally, as illustrated in FIGS. 14 through 16, a turntable 10 formed from a polycarbonate resin is used as the turntable to meet the above-described requirements.

The illustrated turn table 10 is structured by taking advantage of small shrinkage of the polycarbonate resin at the time of molding, and thereby, a good mold transferring ability thereof.

Namely, in the turntable 10, a shaft head portion 20, which fits into an unillustrated circular opening of a CD, is formed at a top portion of a boss portion 16 provided with an insertion hole 12, and a discoid table portion 18, which is provided with a loading portion 14, is provided integrally at the periphery of the shaft head portion 20.

The boss portion 16 is formed in the shape of a thick cylinder. The shaft head portion 20 of the boss portion 16 is formed thick and a cross-sectional configuration thereof is inverted V-shaped. A conical surface portion of the upper side of the shaft head portion 20 is formed as a guide portion 22 for guiding the circular opening of the CD to the shaft head portion 20. A plurality of auxiliary ribs 24 are provided at a portion of the lower side of the boss portion 16 and at an inner portion of a groove of the shaft head portion 20 whose cross-sectional configuration is inverted V-shaped.

An unillustrated iron pan, which is used to suck and hold the CD by magnetic force, is provided on the upper surface of the table portion 18 at the periphery of the shaft head portion 20. The ring-shaped loading portion 14, which stands upright by one step at the upper side of the table portion 18, is formed at the periphery thereof.

Further, gates 26 for injecting the polycarbonate resin, which has been melted within a mold for the turntable 10, are provided at portions of the table portion 18 which are hidden by the unillustrated iron plate.

When the turntable 10 of this configuration is molded and manufactured from the polycarbonate resin, since coefficient of friction of the polycarbonate resin to a metal is large, the coefficient of friction changes by a large amount in accordance with a state of surface roughness or a size of press-contacting force of the polycarbonate resin which presses and contacts the metal. Also, due to large modulus of elasticity, an error in the surface configuration of the polycarbonate resin which presses and contacts the metal cannot be absorbed. In consideration of the above-described facts, it is necessary to manufacture the turntable 10 so that extracting force of a rotational shaft when the turntable 10 is mounted to the rotational shaft of a spindle motor falls within a predetermined range. Moreover, as a material of the turntable 10, a polycarbonate resin containing glass fibers may be also used. In this case, mold shrinkage is even smaller and modulus of elasticity is even larger.

As a result, the turntable 30 is molded at high precision so that, at the time of injection molding, the surface roughness of the inner circumferential surface of the insertion hole 12, through which the rotational shaft of the spindle motor is inserted, is constant, that the inner diameter of the entire insertion hole 12 is constant, that roundness of the entire insertion hole 12 is constant, and that sink at the time of injection molding is not generated at the inner circumferential portion of the insertion hole 12.

Further, when the turntable 10 is mounted to the rotational shaft of the spindle motor, in order that the CD loading portion 14 of the turntable 10 is perpendicular to the rotational shaft of the spindle motor and surface vibrations do not occur, the turntable 10 is molded at high precision so that deformation such as warpage or the like does not occur to the CD loading portion 14 of the turntable 10 and is molded at high precision so as to maintain high perpendicularity of the insertion hole 12 to the loading portion 14.

Regarding the above-described turntable 10 formed from polycarbonate resin which is an expensive material, extremely high injection molding technique and mold management are required when the turntable 10 is manufactured. Thus, the price of the product increases.

Therefore, it is desired that the resin which is a material of the turntable 10 is a polyacetal resin or the like which is comparatively inexpensive and is widely used in general as an engineering plastic.

However, when the polyacetal resin is used as a material and the turntable 10 having the configuration shown in FIGS. 14 through 16 is subjected to injection molding, the following drawbacks may arise. First, due to the characteristic in which mold shrinkage of the polyacetal resin is large, sink at the time of injection molding is generated at the inner circumferential portion of the insertion hole 12, such that extracting force of the rotational shaft when the turntable 10 is mounted to the rotational shaft of the spindle motor may be smaller than a predetermined necessary value. Second, manufacturing error in the rotational shaft of the spindle motor is added to the generation of sink at the inner circumferential portion of the insertion hole 12 at the time of injection molding, such that the extracting force of the rotational shaft when the turntable 10 is mounted to the rotational shaft may be smaller than the predetermined necessary value.

Moreover, since the CD loading portion 14 of the turntable 10 is thick, sink becomes larger and deformation such as warpage or the like occurs easily. Further, because the boss portion 16 which is provided with the insertion hole 12 is thick, deformation due to the sink occurs and a large error is made to positional precision between the boss portion 16 and the loading portion 14. Thus, when the turntable 10 is mounted to the rotational shaft of the spindle motor, the CD loading portion 14 of the turntable 10 is not perpendicular to the rotational shaft of the spindle motor, and surface vibrations may take place.

SUMMARY OF THE INVENTION

With the aforementioned in view, an object of the present invention is to newly provide a turntable and a disk driving device using the same, wherein the turntable can be formed from a comparatively inexpensive material and is also structured so that the predetermined quality of a product can be manufactured easily and inexpensively in accordance with ordinary injection molding technique and ordinary mold management.

A first aspect of the present invention is a turntable on which a disk is loaded, the turntable comprising: a fixing portion into which a rotational shaft which rotates the turntable is pressed, the fixing portion being elastically deformable in a radial direction of the fixing portion; and a reinforcer which is provided at an outer circumference of the fixing portion, the reinforcer generating reaction force against elastic deformation of the fixing portion in the radial direction.

Due to the above-described structure, the radial direction reaction force by the reinforcer for the fixing portion and radial direction reaction force when the fixing portion is elastically deformed are applied to the rotational shaft which was pressed into the fixing portion. Accordingly, the fixing portion presses and contacts the rotational shaft strongly in the radial direction, the fixing portion sufficiently supports the rotational shaft, and extracting force of the rotational shaft which was pressed into the fixing portion can improve.

A second aspect of the present invention is a turntable, comprising: a table portion on which a disk is loaded; and a shaft supporting structural portion which is provided substantially perpendicularly to the table portion at a central portion of the table portion in order to support a rotational shaft which rotates the turntable, wherein the turntable is formed by injection molding and, when the turntable is injection molded, a gate for an injection mold is disposed in a vicinity of the shaft supporting structural portion at the central portion of the table portion.

Due to the above-described structure, the gates are provided in the vicinity of a portion at which the table and the shaft supporting structural portion intersect, and a melted resin which has been injected from the gates enters the mold linearly and reaches every corner of the mold rapidly and uniformly. The entire resin thereby solidifies uniformly. Consequently, at the time of injection molding, deformation due to sink or the like cannot occur to the inner circumferential portion of an insertion hole which is formed at a fixing portion. Therefore, extracting force of the rotational shaft which was pressed into the insertion hole of the fixing portion can improve.

A third aspect of the present invention is a turntable, comprising: a table portion on which a disk is loaded; a thin-walled cylindrical-shaped outer cylindrical portion which is provided at a central portion of the table portion and which fits into an opening of the disk; a thin-walled cylindrical-shaped inner cylindrical portion provided at an inner circumference side of the outer cylindrical portion, the inner cylindrical portion being concentric with the outer cylindrical portion and having a smaller diameter than the outer cylindrical portion; and a rib portion provided from the outer cylindrical portion to the inner cylindrical portion in a radial direction of the inner cylindrical portion.

Due to the above-described structure, the outer cylindrical portion and the inner cylindrical portion are formed thin. Therefore, when the entire table is subjected to injection molding, deformation due to warpage, sink, or the like does not occur to the outer cylindrical portion and the inner cylindrical portion. The turntable can be molded into a predetermined configuration satisfactorily and at high precision.

A fourth aspect of the present invention is a disk driving device, comprising: a rotational shaft which is connected to a spindle motor for driving to rotate a disk and which is driven to rotate by the spindle motor; and a turntable connected to the rotational shaft, on which turntable the disk is loaded, and which turntable rotates the disk, wherein the turntable includes: a fixing portion for the rotational shaft, into which fixing portion the rotational shaft is pressed, the fixing portion being elastically deformable in a radial direction of the fixing portion; and a renforcer for the fixing portion provided at an outer circumference of the fixing portion, the reinforcer generating reaction force against elastic deformation in the radial direction of the fixing portion.

DESCRIPTION OF THE PREFERRED EMBODIMENTS

Figure 1:
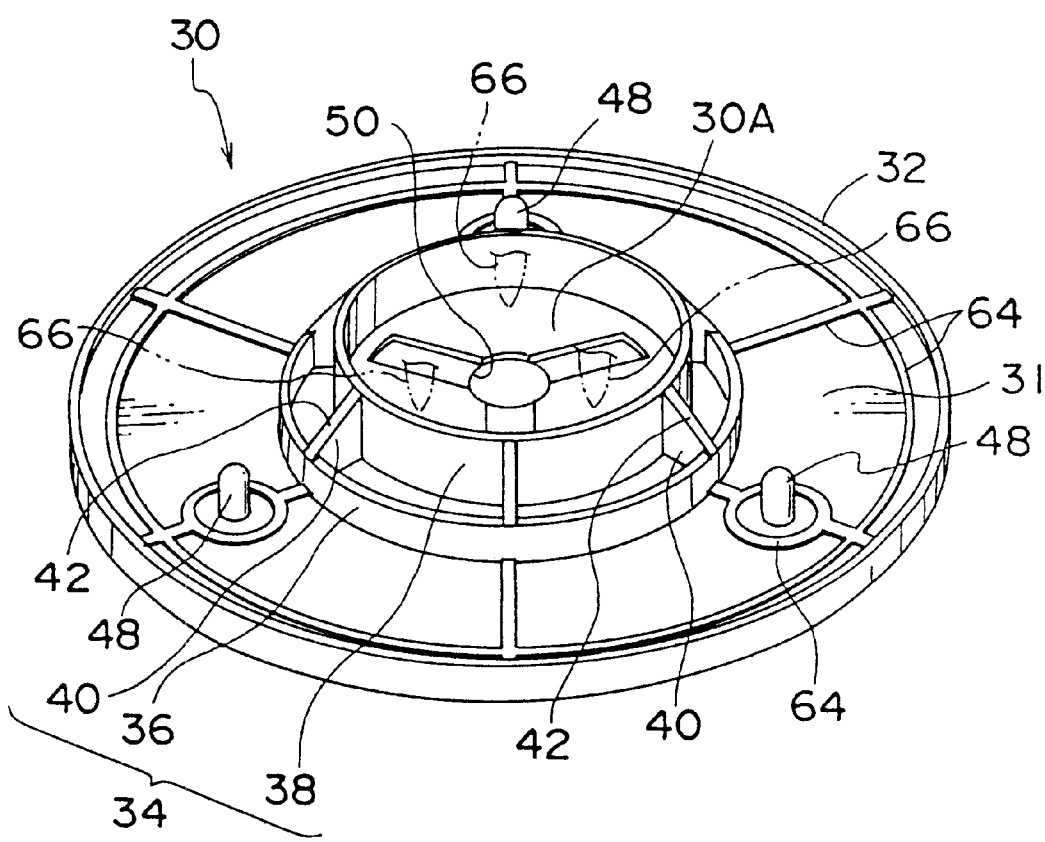
FIG. 1 is an overall perspective view which, as seen from the above, shows a state of a CD disposed side of a turntable relating to an embodiment in a turntable and a disk driving device of the present invention.

An embodiment of a turntable and a disk driving device of the present invention will be explained hereinafter in accordance with FIGS. 1 through 9. A turntable 30 which is used in a compact disk player (CD player) is shown in respective overall views of FIGS. 1 through 4.

The turntable 30 is used by anchoring to a rotational shaft of an unillustrated spindle motor. The compact disk player carries out an operation in which the spindle motor is driven in a state in which a CD, which is a disk serving as a recording medium, is loaded on the turntable 30, and thereby, a signal recorded onto the CD is reproduced by an optical pickup while the CD is rotated integrally with the turntable 30.

As illustrated, the turntable 30 is formed in an integral structure in which a fixing portion is provided at a central portion of a discoid table with respect to a driving shaft. A reference stand 32, which protrudes in a ring shape so as to load the CD, is formed at the outer circumferential portion of one planar portion of the turntable 30 which loads the CD.

Further, a shaft head portion 34, which fits into an unillustrated circular opening of the CD, is formed at a central portion of the planar portion of the turntable 30 which loads the CD. The shaft head portion 34 is formed by a thin cylindrical-shaped outer cylindrical portion 36, a thin cylindrical-shaped inner cylindrical portion 38, and rib portions 40. The outer cylindrical portion 36 is low and has a large diameter. The inner cylindrical portion 38 is high, has a small diameter, and is formed concentric with the outer cylindrical portion 36. The rib portions 40 are provided between the outer cylindrical portion 36 and the inner cylindrical portion 38 in the radial directions.

Figure 3:
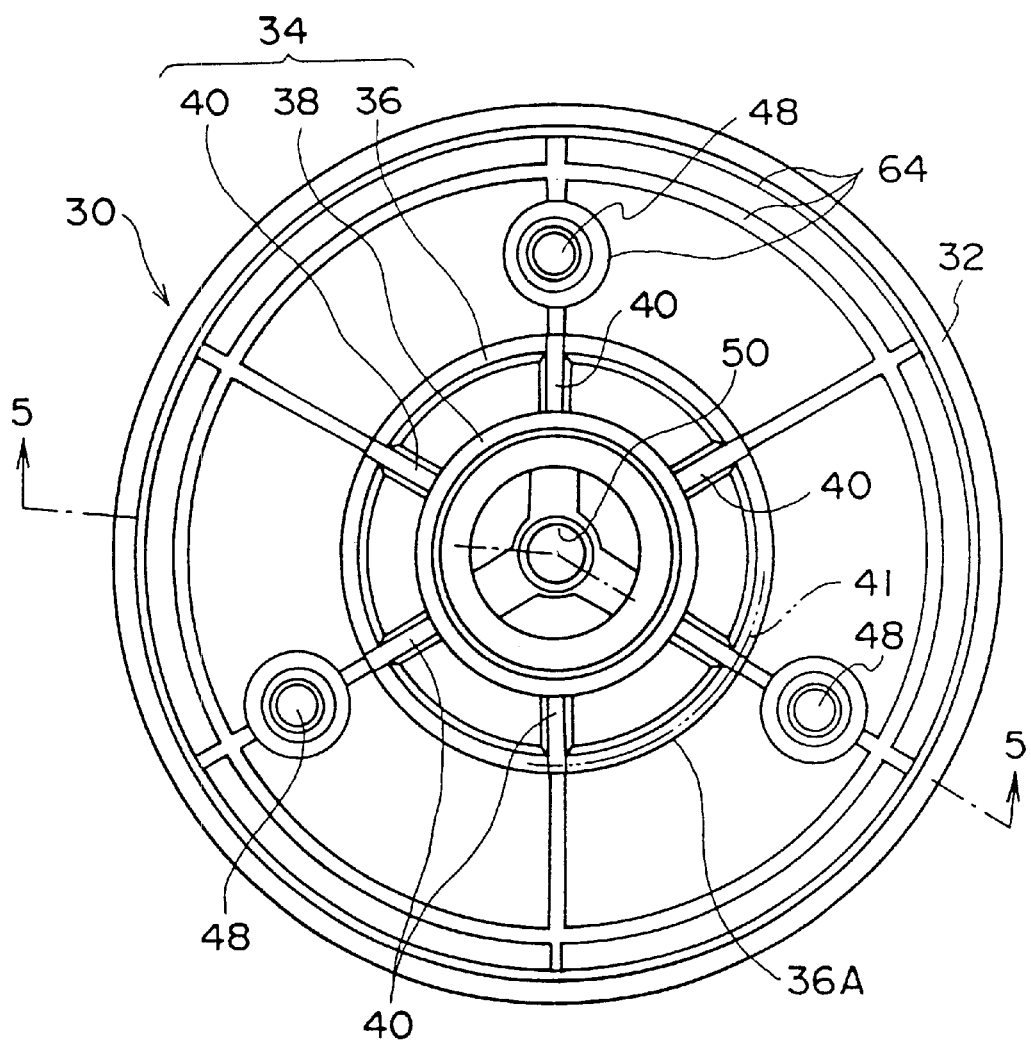
FIG. 3 is an overall plan view which shows the CD disposed side of the turntable relating to the embodiment in the turntable and the disk driving device of the present invention.
Figure 5:
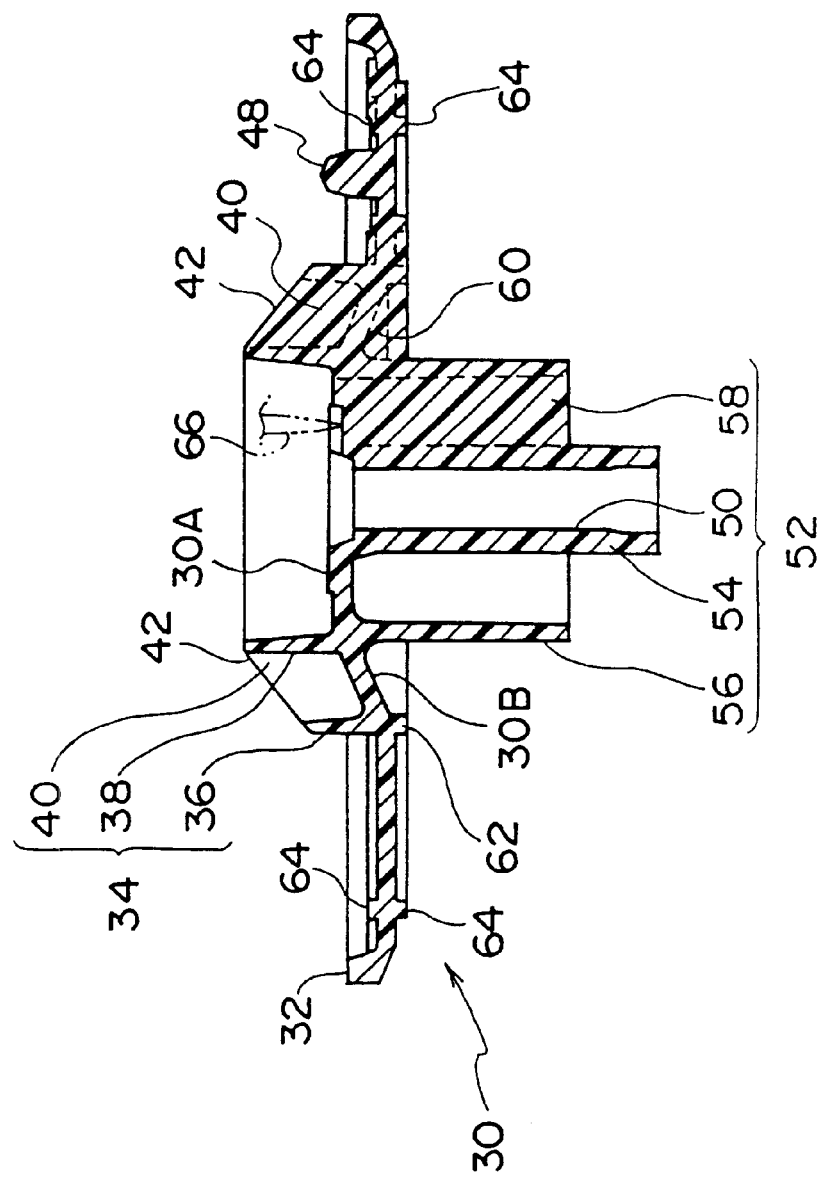
FIG. 5 is a cross-sectional view of a surface cut along line 5—5 in FIG. 3.
Figure 6:
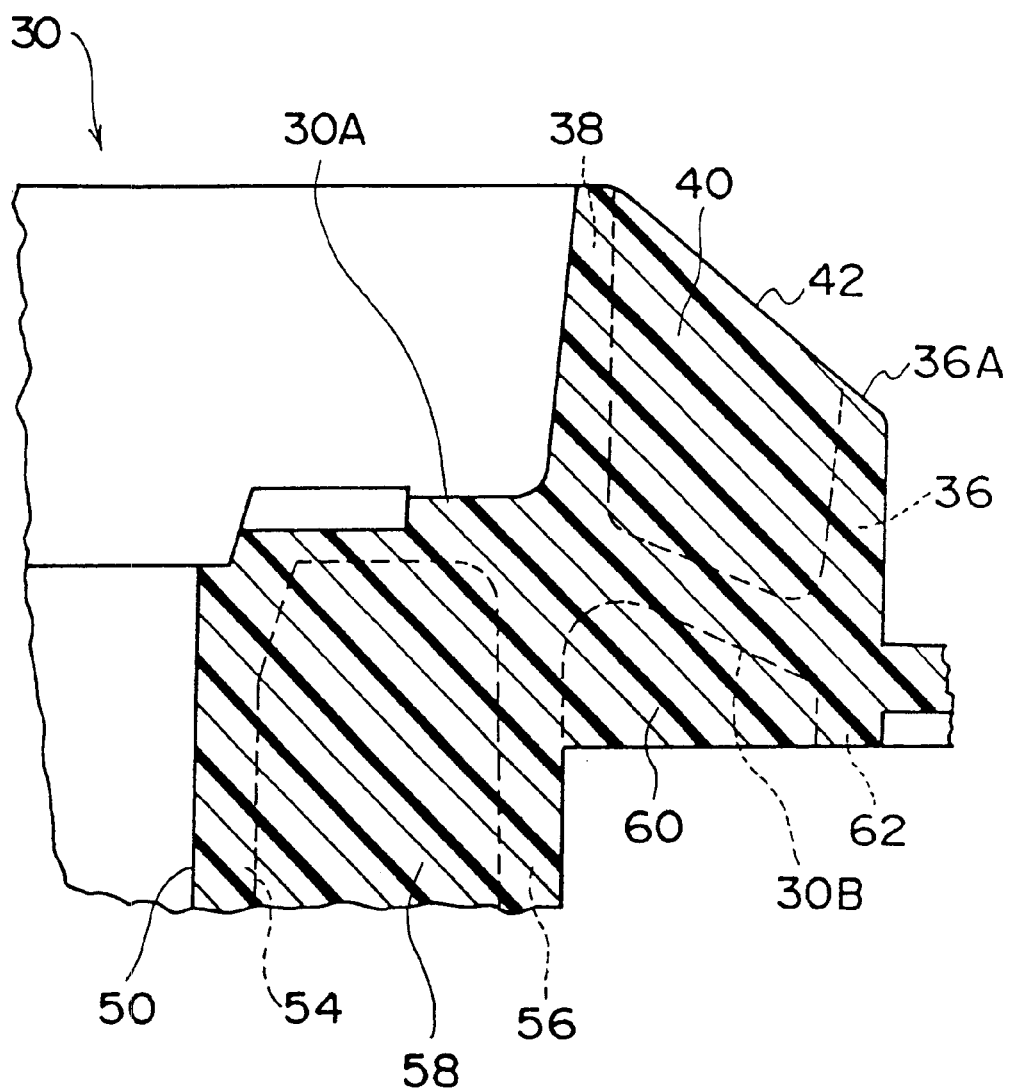
FIG. 6 is an enlarged cross-sectional view of a main portion of a shaft head portion in the turntable relating to the embodiment in the turntable and the disk driving device of the present invention.
Figure 7:
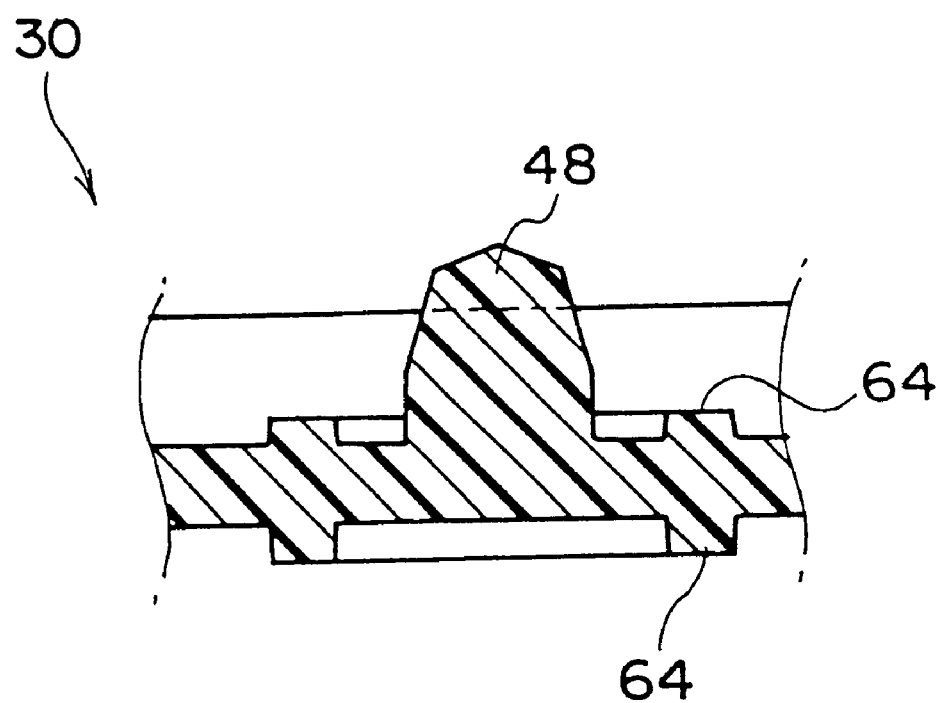
FIG. 7 is an enlarged cross-sectional view of a main portion of an anchoring pin portion in the turntable relating to the embodiment in the turntable and the disk driving device of the present invention.

As shown in FIGS. 1 and 3, the rib portions 40 are disposed at positions such that a central angle of the turntable 30 is divided into six angles thereby and each angle defined by the rib portions 40 is 60 degrees. As shown in FIGS. 5 and 6, a free end edge of each rib portion 40 forms a hypotenuse 42 which diagonally and linearly connects a free end edge of the outer cylindrical portion 36 and a free end edge of the inner cylindrical portion 38.

When a circumferential portion of the circular opening of the CD loads on the hypotenuse 42 of each rib portion 40, the hypotenuse 42 guides the CD so that the CD slides on the hypotenuse 42 by its own weight and the circular opening of the CD fits with the outer cylindrical portion 36. As this time, as shown in FIG. 3, catching-on preventing means may be formed so that a circular opening 41 of the CD shown by an imaginary line is prevented from catching on a free end edge 36A of the outer cylindrical portion 36 which is provided between the respective rib portions 40.

Figure 8:
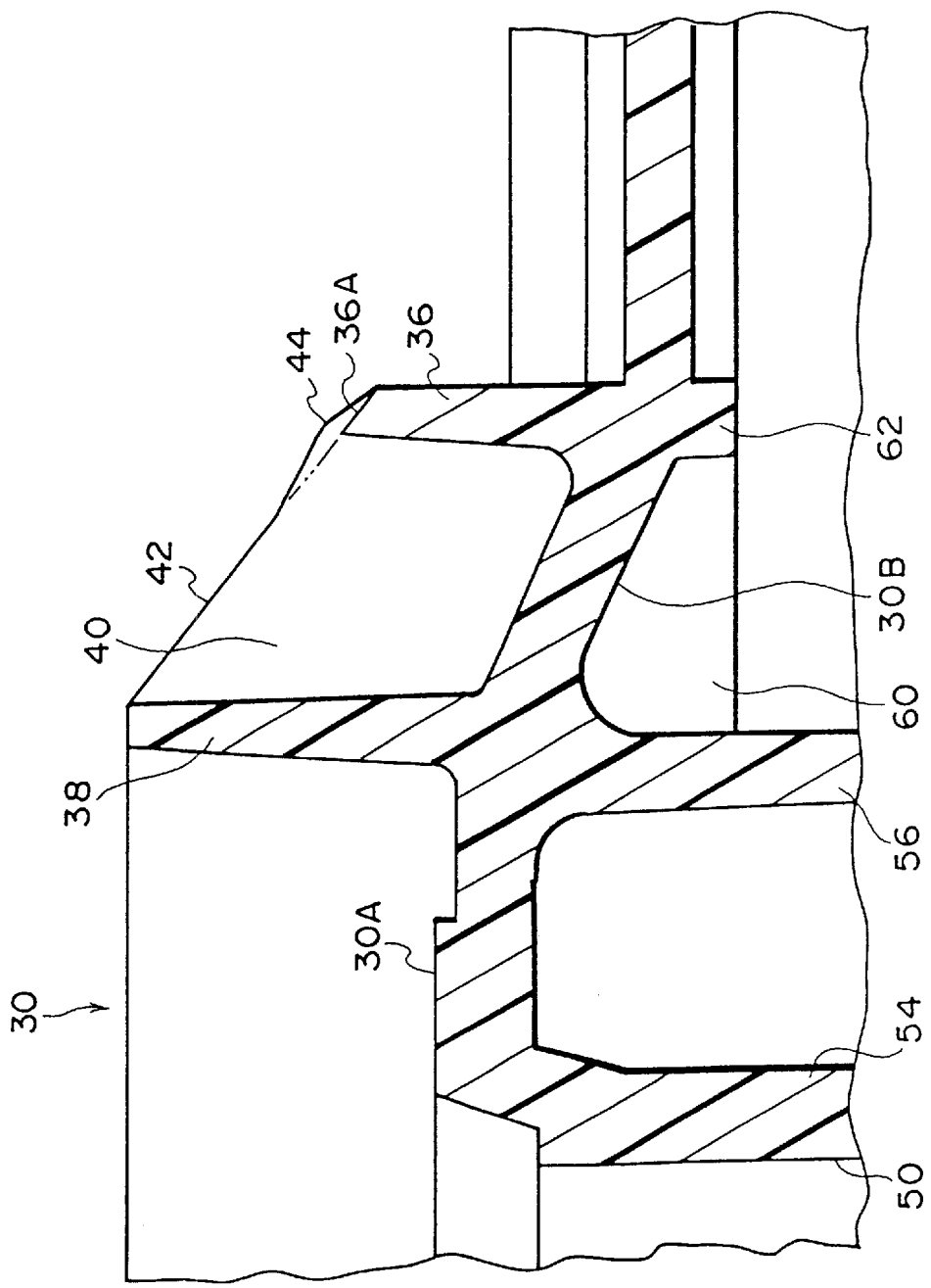
FIG. 8 is an enlarged cross-sectional view of a main portion which shows a structure of a guide projecting portion in the shaft head portion of the turntable relating to the embodiment in the turntable and the disk driving device of the present invention.

In FIG. 8, for example, the catching-on preventing means forms a low triangular guide projecting portion 44 at a portion of the hypotenuse 42 which is in a vicinity of the outer cylindrical portion 36. The guide projecting portion 44 raises by a small amount the circular opening 41 of the CD which slid down the hypotenuse 42, such that the circular opening 41 of the CD is prevented from catching on a free end surface of the outer cylindrical portion 36.

Figure 9:
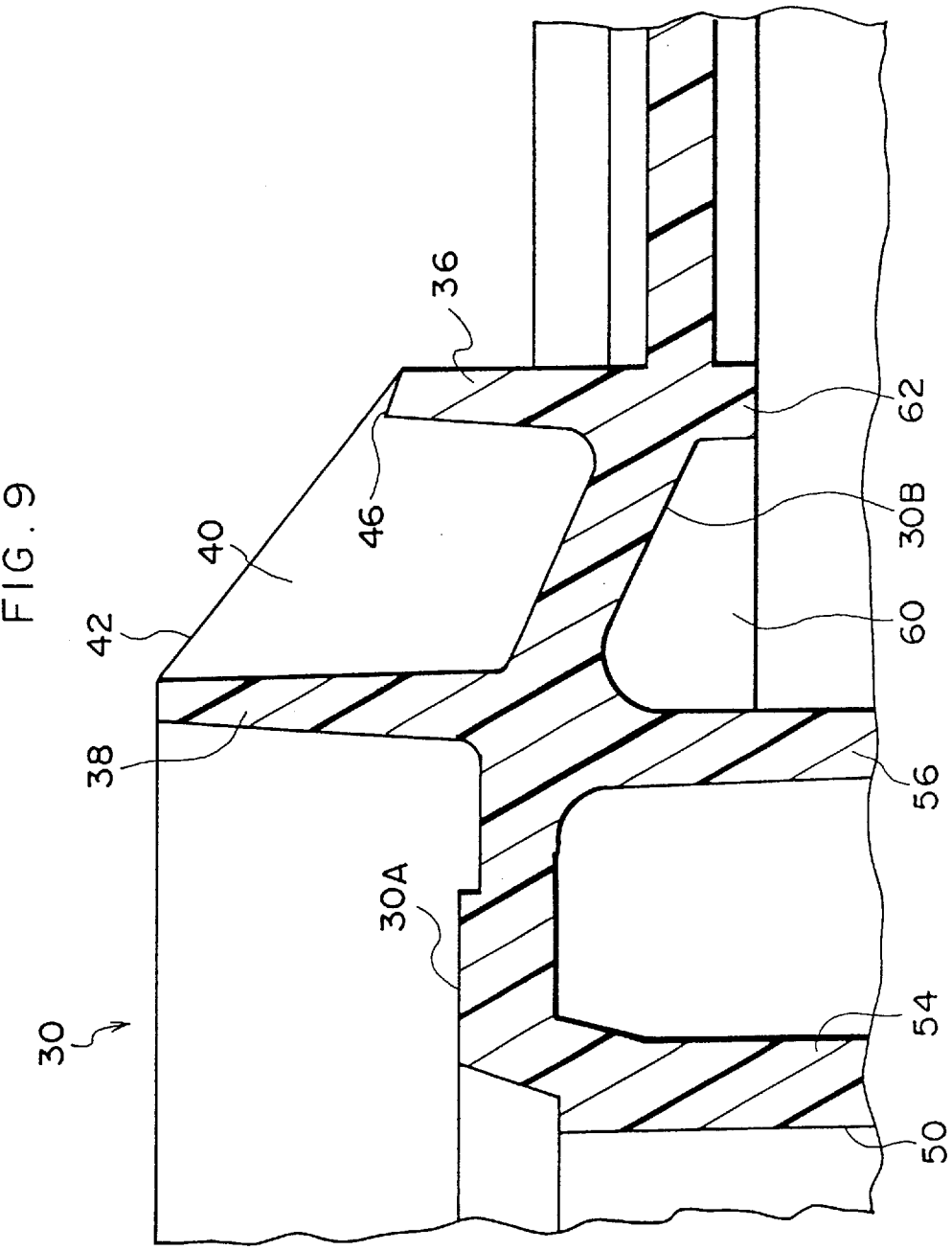
FIG. 9 is an enlarged cross-sectional view of a main portion which shows a structure of a free end surface portion of an outer cylindrical portion in the shaft head portion of the turntable relating to the embodiment in the turntable and the disk driving device of the present invention.

Further, as illustrated in FIG. 9, the catching-on preventing means forms a cut-out free end surface portion 46 at the outer cylindrical portion 36, and the cut-out free end surface portion 46 is formed low so as to withdraw more than the hypotenuse 42 of each rib portion 40. The circular opening portion of the CD which slid down the hypotenuse 42 is prevented from catching on the cut-out free end surface portion 46 of the outer cylindrical portion 36.

As shown in FIG. 5, the shaft head portion 34 of the turntable 30 is disposed at a table central portion 30A. A portion near the peripheral portion of the table central portion 30A is gently bent so as to protrude toward the planar side of the turntable 30 on which the CD is loaded. The entire table central portion 30A protrudes and forms in the shape of a plate which is turned over.

As shown in FIGS. 1, 3, and 5, at an intermediate planar portion between the reference stand 32 and the shaft head portion 34 in the planar portion of the turntable 30 on which the CD is loaded, anchoring pins 48 stand upright at predetermined positions with respect to the center of the turntable 30 such that the central angle of the turntable 30 is divided into three. The anchoring pins 48 are used for anchoring an unillustrated magnetic plate. The magnetic plate is provided at the intermediate planar portion between the reference stand 32 and the shaft head portion 34 of the turntable 30.

In the turntable 30, the CD is disposed on the upper side of the magnetic plate anchored by the anchoring pins 48, a chucking member is disposed on the CD, and the CD is chucked to the turntable 30 by magnetic force of the chucking member which sucks to the magnetic plate.

Figure 2:
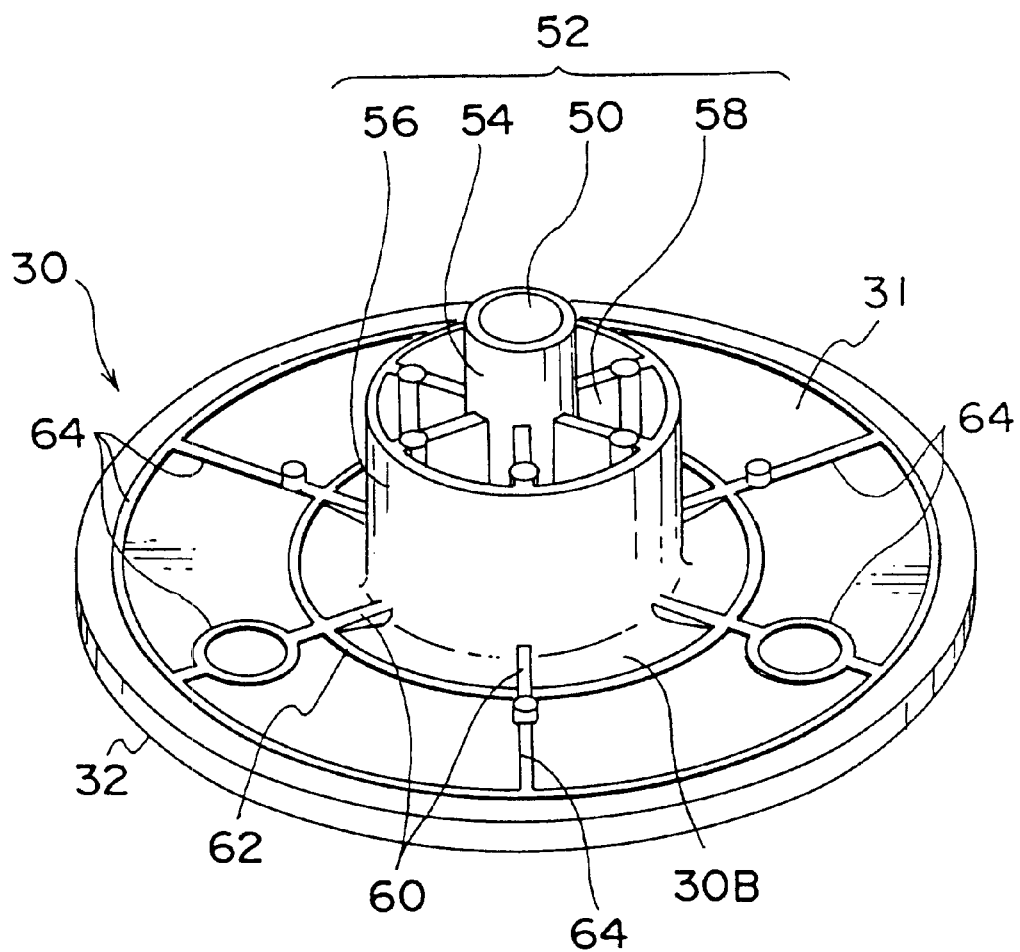
FIG. 2 is an overall perspective view which, as seen from the below, shows a state of the CD disposed side of the turntable relating to the embodiment in the turntable and the disk driving device of the present invention.
Figure 4:
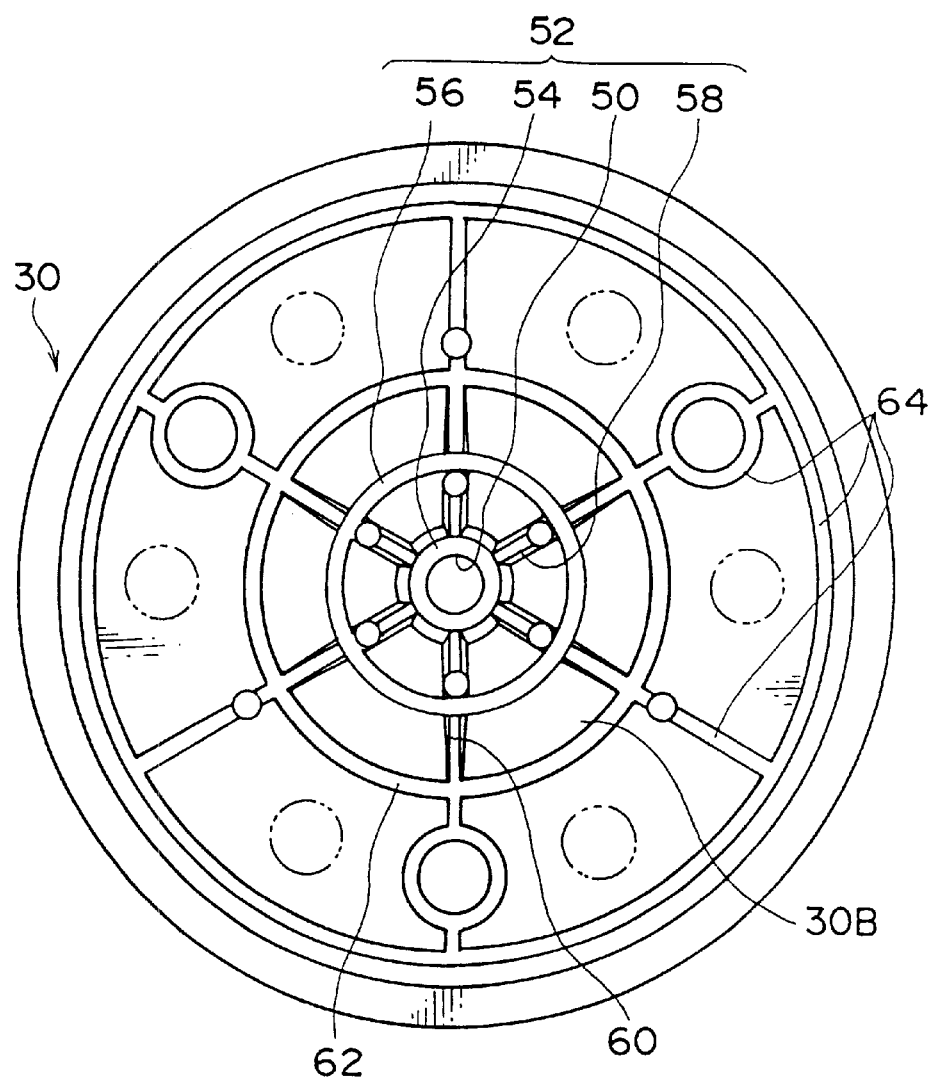
FIG. 4 is an overall plan view which shows the CD disposed side of the turntable relating to the embodiment in the turntable and the disk driving device of the present invention.

As shown in FIGS. 2, 4, and 5, the turntable 30 is provided with a fix/mounting portion 52 at another side surface portion (a side surface portion which is on the reverse side of the side surface portion on which the CD is loaded) of the table central portion 30A. The fix/mounting portion 52 has an insertion hole 50 into which the rotational shaft of the spindle motor is pressed.

The fix/mounting portion 52 has a thin cylindrical-shaped fixing portion 54, a thin cylindrical-shaped reinforcing portion 56, and reinforcing rib portions 58. The fixing portion 54 is high, has a small diameter, and is provided with the insertion hole 50. The reinforcing portion 56 is low, has a large diameter, and is formed concentric with the fixing portion 54. The reinforcing rib portions 58 are provided between the fixing portion 54 and the reinforcing portion 56 in the radial directions.

The inner diameter of the insertion hole 50 is formed smaller by a predetermined minute length than the outer diameter of the rotational shaft of the unillustrated spindle motor. In this way, when the rotational shaft of the spindle motor presses into the insertion hole 50, the fix/mounting portion 52 elastically deforms so as to increase the diameter thereof in the radial direction and press-contacts the rotational shaft of the spindle motor.

Further, when the outer diameter of the fixing portion 54 increases at the time of pressing of the rotational shaft, the reinforcing portion 56 is also elastically deformed so as to increase the diameter thereof in the radial direction via the respective reinforcing rib portions 58. Since reaction force which elastically deforms the reinforcing portion 56 serves as force which press-contacts the fixing portion 54 with the rotational shaft of the spindle motor, the press-contacting force is reinforced and increased.

Accordingly, extracting force of the rotational shaft after the rotational shaft of the spindle motor was pressed into and mounted to the insertion hole 50 of the turntable 30 can be strictly set to a value within a predetermined range, and rotational torque can be reliably transmitted to the turntable 30 from the rotational shaft of the spindle motor.

Moreover, because the fixing portion 54 and the reinforcing portion 56 are thin, even if the fixing portion 54 and the reinforcing portion 56 are elastically deformed by a comparatively large amount, damage such as a crack or the like is hardly inflicted thereon. Thus, a pressing allowance of the insertion hole 50 is increased, the rotational shaft is pressed in strongly, and the extracting force can be increased.

As shown in FIGS. 2, 5, and 6, a portion 30B of the table central portion 30A which is bent and caved in surrounds the outer side of the reinforcing portion 56. Auxiliary rib portions 60 are formed at the bent-and-caved-in portion 30B so as to be continuous with the reinforcing rib portions 58.

Due to this structure, the outer diameter of the fix/mounting portion 52 is increased when the rotational shaft is pressed into, and the force which also increases the diameter of the reinforcing portion 56 in the radial direction via the respective reinforcing rib portions 58 is supported at a discoid table portion of the turntable 30 via the auxiliary rib portions 60. Thus, rigidity of a portion at which the auxiliary rib portions 60 are disposed becomes high.

Consequently, the extracting force against the pressed-in rotational shaft can be partially strengthened at a portion of the inside of the insertion hole 50, which portion is near the table central portion 30A in the axial direction of the insertion hole 50.

Further, as shown in FIG. 5, first, the principal structural portion of the turntable 30 has comparatively thin and fixed thickness. Namely, a table portion 31 which is provided from the table central portion 30A to the reference stand 32, the outer cylindrical portion 36, the rib portions 40, the fixing portion 54, the reinforcing portion 56, and the like are set to have comparatively thin and constant thickness.

Second, the cross-sectional configuration of the entire turntable 30 is as cruciform as possible (at least T-shaped). Namely, the cross-sectional configurations, with respect to the table which is continuous with the table central portion 30A, of the inner cylindrical portion 38 and the reinforcing portion 56, of the outer cylindrical portion 36 and a small rib 62 corresponding thereto, of a pair of small structured ribs 64, which are formed so as to correspond to the front and reverse of the table and the like are set to be cruciform.

In this way, when the cross-sectional configuration of the turntable 30 is cruciform, relative inclination of crossing walls by sink or the like at the time of injection molding can be prevented. Namely, for example, when the cross-sectional configuration of the turntable 30 is L-shaped, the walls which cross at a right angle are easily deformed so as to have an acute angle. However, when the cross-sectional configuration is cruciform, such deformation can be prevented.

Third, a gate 66 is set to an intermediate position between the fixing portion 54 and the reinforcing portion 56 in the table central portion 30A. The gate 66 is used when the turntable 30 is subjected to injection molding by using an unillustrated mold.

By having the aforementioned first, second, and third structures, when a melted resin is injected into the mold through the gate 66, the melted resin flows directly to the fixing portion 54 and the reinforcing portion 56 and rapidly and uniformly to the table portion 31 which is provided from the table central portion 30A to the reference stand 32.

Accordingly, because the melted resin which was injected from the gate 66 at the time of injection molding of the turntable 30 rapidly spreads to the entire inner portion of the mold, solidification of the entire resin progresses uniformly. Thus, a so-called warpage of a molded finished product can be reduced.

Moreover, since the respective portions of the turntable 30 are thin, a so-called sink at the time of injection molding can be reduced. In particular, because the fixing portion 54 is thin as compared to that of the conventional example, the sink is reduced, surface roughness of the inner circumferential surface of the insertion hole 50 is reduced, a molding error in the inner diameter of the insertion hole 50 is reduced, a molding error in roundness of the insertion hole 50 is reduced, and thereby the insertion hole 50 can be molded at high precision. Therefore, the turntable 30 can be assembled so that the extracting force of the rotational shaft after the rotational shaft of the spindle motor was pressed into the insertion hole 50 is set to a high predetermined value.

Further, the overall structure of the aforementioned turntable 30 is suitable for injection molding from a polyacetal resin. When the turntable 30 is subjected to injection molding from the polyacetal resin, because the polyacetal resin has characteristics in which modulus of elasticity and coefficient of friction are comparatively small, even if there are some changes in the surface roughness of the inner circumferential surface of the insertion hole 50, changes in the inner diameter thereof, or changes in the roundness of the hole, and further, even if there is some manufacturing error in the diameter of the rotational shaft which is pressed into the insertion hole 50, a rate of changing the extracting force of the rotational shaft which was pressed into the insertion hole 50 can be reduced.

In the present embodiment, the inexpensive polyacetal resin is used as a material. However, it goes without saying that an engineering plastic such as a polycarbonate resin or the like may be used as a material. Moreover, the structure of the turntable 30 in the present embodiment is applicable to turntables of various types of electrical equipments other than the compact disk player.

EXAMPLES

Next, an example in which the structure of the fix/mounting portion of the turntable in the turntable and the disk driving device relating to the embodiment of the present invention is modified will be explained in accordance with FIGS. 10 and 11. In the turntable 30, a reinforcing structure, in which thin plates are formed integrally so as to cross three-dimensionally, is provided at the periphery of the fixing portion 54 for the rotational shaft as a shaft supporting structural portion.

The three-dimensional reinforcing structure of the thin plates has a plurality of first reinforcing plate portions 70, a plurality second reinforcing plate portions 72, and a plurality of third reinforcing plate portions 74. Each first reinforcing plate portion 70 is formed in the shape of a small rectangular thin plate. The first reinforcing plate portion 70 is formed integrally so as to extend from a place at the periphery of the thin cylindrical fixing portion 54, in which a rotational shaft 76 of a spindle motor is fit into the insertion hole, along the table central portion 30A in the outward radial direction of the fixing portion 54. When the rotational shaft 76 is inserted through the insertion hole of the fixing portion 54, the first reinforcing plate portions 70 elastically prevent expansion of the periphery of the fixing portion 54 in the radial directions and maintain a state in which the rotational shaft 76 is tightly inserted through the insertion hole.

Each second reinforcing plate portion 72 is provided at a distal end edge portion of one of the first reinforcing plate portions 70 in the radial direction thereof. The second reinforcing plate portion 72 is formed in a configuration in which a thin rectangular plate forms a portion of a circumference which is concentric with the fixing portion 54 and is bent planar arc-shaped. The second reinforcing plate portion 72 is provided integrally with the table central portion 30A so as to stand upright therefrom. The second reinforcing plate portions 72 prevent falling of the first reinforcing plate portions 70 in directions orthogonal to the radial directions.

Each third reinforcing plate portion 74 is provided at the outer side of the second reinforcing plate portion 72. The third reinforcing plate portion 74 is formed as if the first reinforcing plate portion 70 penetrates through the second reinforcing plate portion 72 and extends in the radial direction. The third reinforcing plate portion 72 is triangular thin plate-shaped and is formed integrally so that the third reinforcing plate portion 72 extends from the outer curved surface of the second reinforcing plate portion 72 to the bent-and-caved-in portion 30B of the table central portion 30A.

When the rotational shaft 76 is inserted through the insertion hole of the fixing portion 54, the third reinforcing plate portion 74 assists the operation of the first reinforcing plate portion 70 which elastically prevents expansion of the fixing portion 54. Further, because the first reinforcing plate portion 70, the second reinforcing plate portion 72, and the third reinforcing plate portion 74 are planar cruciform, molding strain at the time of injection molding does not remain.

Structures, operations, and effects other than those described above in this example are the same as those in the aforementioned embodiment. Therefore, the same members are denoted by the same reference numerals and detailed descriptions thereof will be omitted.

Figure 10:
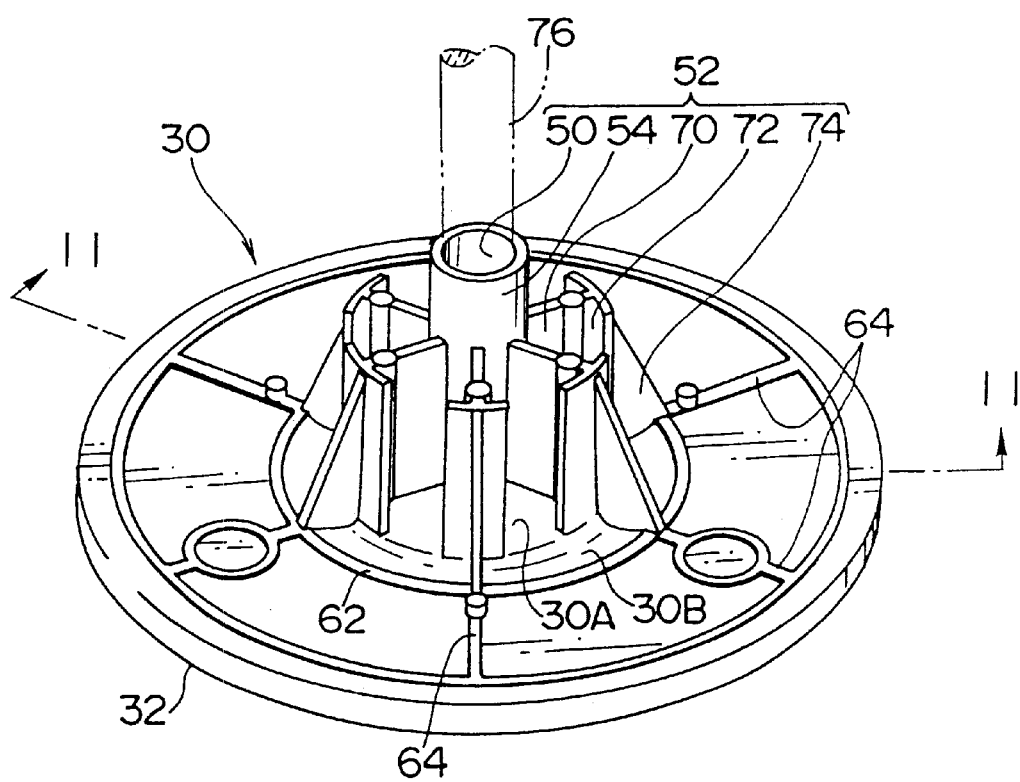
FIG. 10 is an overall perspective view which, as seen from the below, shows a state of a CD disposed side of a turntable relating to an example in the turntable and the disk driving device of the present invention.
Figure 11:
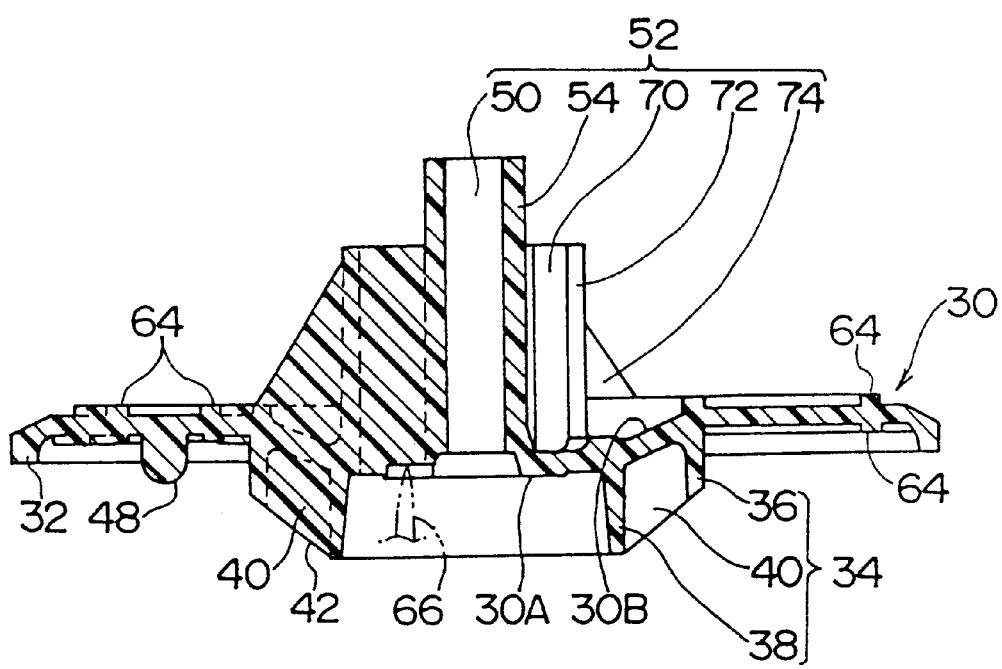
FIG. 11 is a cross-sectional view of a surface cut along line 11—11 in FIG. 10.

In the turntable and the disk driving device of the present invention, a synergistic effect is obtained when the turntable is formed in the shape of the turntable in the embodiment shown in FIGS. 1 through 9 or the shape of the turntable in the example shown in FIGS. 10 and 11 and the plastic material forming the turntable is a predetermined polyacetal resin.

Next, the polyacetal resin (POM) which is suitable for using as the material of the turntable of the present invention will be explained.

A commercially-available polyacetal resin can be used. For example, the polyacetal resin (POM) which is suitable for using as the material of the turntable includes Grades 100, 150SA, 500, 507, 550SA, 900, 100P, 500P, 900P, 1700P, 100ST, 500T, 500AF, 500CL, DE8502, DE8903 of Delrin(registered trademark) manufactured by Du Pont Kabushiki Kaisha; Grades M25, M90, M140, M270, M450, U10-01, AW-01, SW-01, YF-10, YF-20, ES-5, VC-10 of Duracon (registered trademark) manufactured by Polyplastics Co., Ltd.; Grades 2010, SH210, 3010, SH310, 4010, SH410, 4060, 5010, SH510, 7010, SH710, 5050, 7054, 9054, 2013A, 3013A, 4013A, 5013A, LT802, LT804, LT200, FS410, LA541, LM511, 4012 (homopolymers) of Tenak (registered trademark) and Grades 3510, EX352, 4520, 5520, 7520, 8520, 9520, 7554, 3513, 4513, 4563, 7513, EF750, TFC64 (copolymers) of Tenak-C (registered trademark) manufactured by Asahi Chemical Industry Co., Ltd., or a polyacetal resin having physical properties which are similar to these mechanical properties.

The principal mechanical properties relating to respective suitable grades of the aforementioned Delrin (registered trademark) manufactured by Du Pont Kabushiki Kaisha will be described in the following tables.

TABLE 1

| | | | Physical properties | | | | | | |
|---|---|---|---|---|---|---|---|---|---|
| | | | General | | | High productivity | | | |
| | | | High viscosity 100, | Medium viscosity 500, 507, | Low viscosity | High viscosity | Medium viscosity | Low viscosity | |
| | ASTM | Unit | 150SA | 550SA | 900 | 100P | 500P | 900P | 1700P |
| Mechanical properties | | | | | | | | | |
| Tensile strength 23° C. | D638 | kg/cm² | 700 | 700 | 700 | 700 | 700 | 700 | 710 |
| Tensile extension (when broken away) 23° C. | D638 | % | 85 | 50 | 25 | 85 | 50 | 25 | 25 |
| Tensile elasticity modulus 23° C. | D638 | kg/cm² | 31600 | 31600 | 31600 | 32900 | 34300 | 37100 | — |
| Bending elasticity modulus 23° C. | D790 | kg/cm² | 25700 | 28800 | 30200 | 29000 | 31500 | 32900 | 33000 |
| Bending strength 23° C. | D790 | kg/cm² | 1010 | 990 | 980 | 1010 | 990 | 980 | 1050 |

TABLE 2

| | | | Physical properties | | | | |
| --- | --- | --- | --- | --- | --- | --- | --- |
| | | | | | | Low friction, Low wear grade | |
| | | | Impact resistance grade | | | 500CL, DE | |
| | ASTM | Unit | 100ST | 500ST | 500AF | 8502 | DE8903 |
| Mechanical properties | | | | | | | |
| Tensile strength 23° C. | D638 | kg/cm² | 660 | 530 | 490 | 670 | 660 |
| Tensile extension (when broken away) 23° C. | D638 | % | 521 | 91 | 15 | 50 | 50 |
| Tensile elasticity modulus 23° C. | D638 | kg/cm² | 13000 | 23800 | 29500 | 31600 | — |
| Bending elasticity modulus 23° C. | D790 | kg/cm² | 13000 | 22800 | 24600 | 30000 | 31000 |
| Bending strength 23° C. | D790 | kg/cm² | 410 | 720 | 720 | 910 | 970 |

Next, the turntable 30 having the configuration of the present embodiment shown in FIGS. 1 through 9 was manufactured from Grade 900P of Delrin (registered trademark) of Du Pont Kabushiki Kaisha. The relationship between pressing-in force, extracting force and changes in the rotational shaft diameter (shaft diameter) when the rotational shaft (shaft) of the spindle motor was fit into the insertion hole 50 of the fix/mounting portion 52 was measured.

Method of Measuring

1. Pressing-in Force

The rotational shaft of the spindle motor was stood upright and fixed. The turntable 30 was loaded on the distal end portion of the rotational shaft (shaft) in a state in which the rotational shaft was inserted into the insertion hole 50 of the fix/mounting portion 52 by a small amount. Next, pressure was applied from the upper side of the turntable 30 to the rotational shaft. The maximum value (peak value) when the rotational shaft pressed into the insertion hole 50 by approximately 8 mm is defined as pressing-in force.

2. Extracting Force

After the above-described pressing-in, the turntable 30 and the rotational shaft were stored for 48 hours or more in an atmosphere at a temperature of 60° C. and at a humidity of 90%. Then, pressure was further applied in the pushing direction. The pressing force when the rotational shaft started to move is defined as extracting force.

The relationship of pressing-in force (unit: kg), extracting force (unit: kg) to the rotational shaft (shaft) of each of the three spindle motors having different rotational shaft diameters (shaft diameters) was measured. The results shown in the following Table 3 were obtained.

TABLE 3

Relationship between Shaft Diameter of Turntable (Manufactured from POM) and Pressing-in Force, Extracting Force

| Shaft diameter | Pressing-in force | Extracting force |
| --- | --- | --- |
| 1.975 | 12.3 | 8.0 |
| 1.975 | 13.8 | 7.0 |
| 1.975 | 12.7 | 7.4 |
| 1.975 | 11.4 | 6.5 |
| 1.975 | 11.9 | 7.1 |
| 1.975 | 12.6 | 8.0 |
| 1.980 | 12.8 | 6.6 |
| 1.980 | 12.7 | 6.6 |
| 1.980 | 13.7 | 7.6 |

TABLE 3-continued

Relationship between Shaft Diameter of Turntable (Manufactured from POM) and Pressing-in Force, Extracting Force

| Shaft diameter | Pressing-in force | Extracting force |
| --- | --- | --- |
| 1.980 | 13.8 | 6.9 |
| 1.980 | 13.6 | 7.4 |
| 1.980 | 11.3 | 7.7 |
| 1.985 | 14.8 | 7.3 |
| 1.985 | 13.8 | 7.5 |
| 1.985 | 15.1 | 8.2 |
| 1.985 | 15.5 | 9.1 |
| 1.985 | 13.9 | 7.6 |
| 1.985 | 16.1 | 10.7 |
| 2.000 | 20.5 | 10.8 |
| 2.000 | 20.1 | 8.9 |
| 2.000 | 20.8 | 9.1 |
| 2.000 | 19.4 | 9.6 |
| 2.000 | 18.3 | 9.9 |
| 2.000 | 15.7 | 9.1 |

Figure 12:
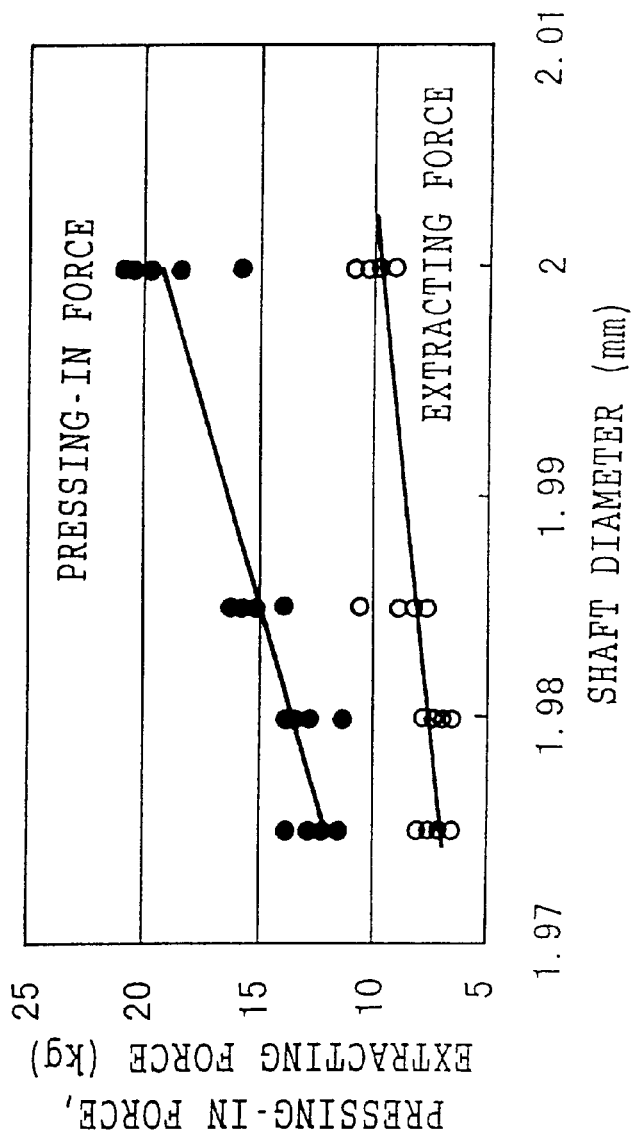
FIG. 12 is a graph showing a relationship of pressing-in force and extracting force to a polyacetal resin-made turntable relating to the embodiment in the turntable and the disk driving device of the present invention.

The results of measurement in Table 3 are shown in a graph in FIG. 12. As is found from the graph, the rate of change in the pressing-in force with respect to the rotational shaft diameter (shaft diameter, unit: mm) is as low as 0.3 kg/μm, and the rate of change in the extracting force (unit: kg) with respect to the rotational shaft diameter (shaft diameter) is extremely as low as 0.1 kg/μm.

Accordingly, even if there are some changes in the surface roughness of the inner circumferential surface of the insertion hole which is formed at the fixing portion, changes in the inner diameter of the hole, changes in the roundness of the hole, or even if dimensional dispersion due to an error in the rotational shaft diameter (shaft diameter) or the like is somewhat larger than the usual dimensional dispersion, because the changes in pressing-in force and extracting force are small, the turntable 30 which is fit with the rotational shaft (shaft) of the spindle motor can sufficiently withstand the use. Together with this, since the polyacetal resin has characteristics in which modulus of elasticity and coefficient of friction are comparatively small, the rate of changing the extracting force with respect to the rotational shaft which was fit into the insertion hole can be made small.

Moreover, in the turntable and the disk driving device relating to the present embodiment, it is found that the extracting force may be set to 5 kg or more so that the turntable does not move due to the impact such as falling or the like.

As a result, when the turntable 30 is manufactured from the polyacetal resin (POM), the operation of injection molding may be carried out so as to obtain ordinary precision, the precision of mold may also be ordinary precision, the management thereof is sufficient with ordinary care, and the turntable 30 can be manufactured easily and rapidly without a lot of labor. Consequently, manufacturing of the turntable 30 from the polyacetal resin (POM) which is a comparatively inexpensive material is suitable for mass production, improves manufacturing efficiency, and can provide an inexpensive product.

In the turntable and the disk driving device of the present invention, the extracting force of the rotational shaft changes due to the structure and the molding state of the fix/mounting portion 52, the composition of the polyacetal resin, or the like. However, according to a rule of thumb or the like, the turntable 30 can withstand the use provided that the turntable 30 is mounted to the rotational shaft so as to have a predetermined value or more of extracting force. Namely, the material and the structure of the turntable 30 may be selected in such a way that the extracting force is 5 kg or more so that the turntable 30 does not move due to the impact such as falling or the like. Thus, it goes without saying that the turntable 30 can be formed by selecting from a various types of materials so as to correspond to the structure or the like.

Figure 14:
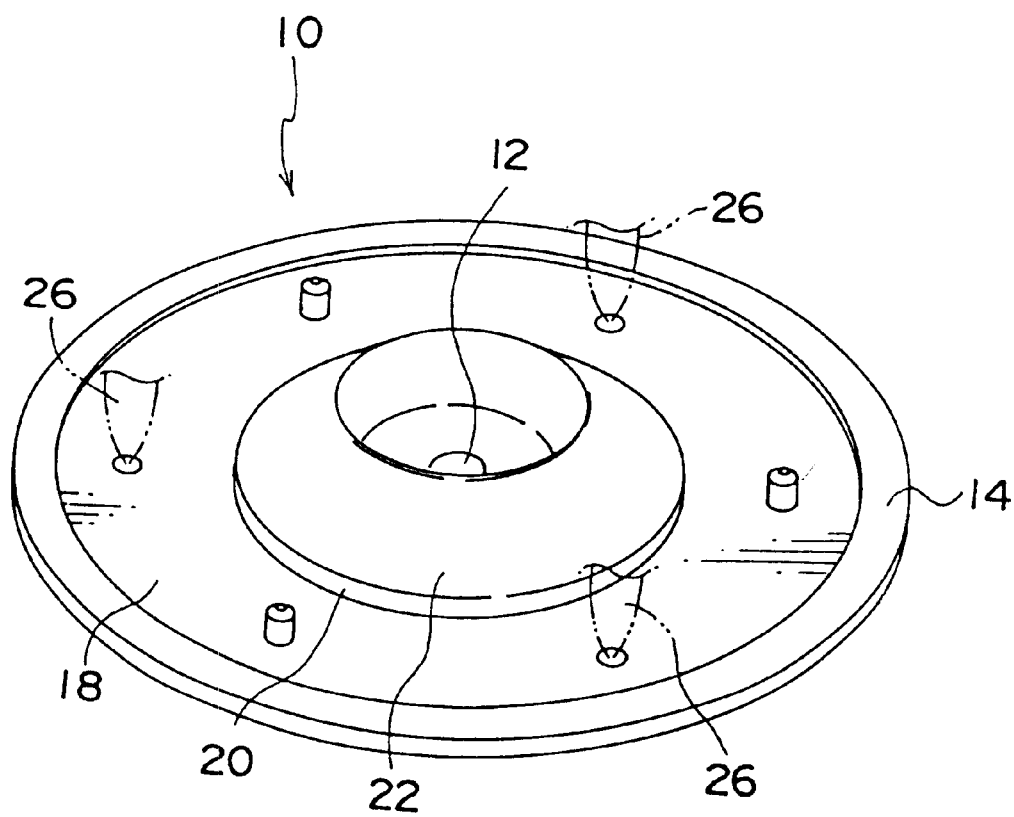
FIG. 14 is an overall perspective view which, as viewed from the above, illustrates a state of a CD disposed side of a conventional turntable.
Figure 15:
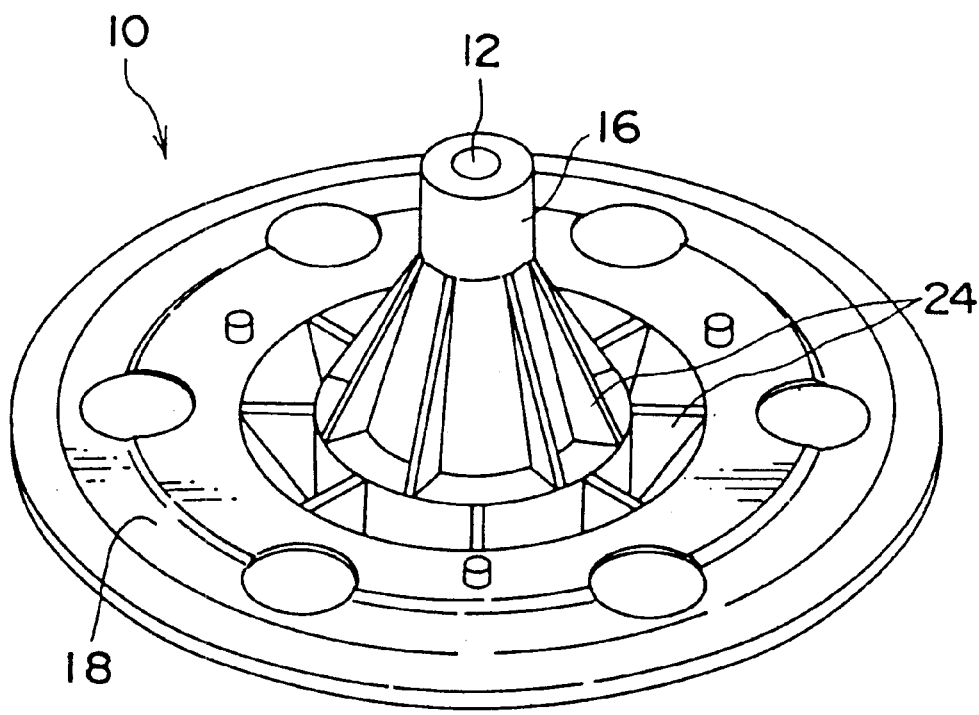
FIG. 15 is an overall perspective view which, as viewed from the below, illustrates a state of the CD disposed side of the conventional turntable.
Figure 16:
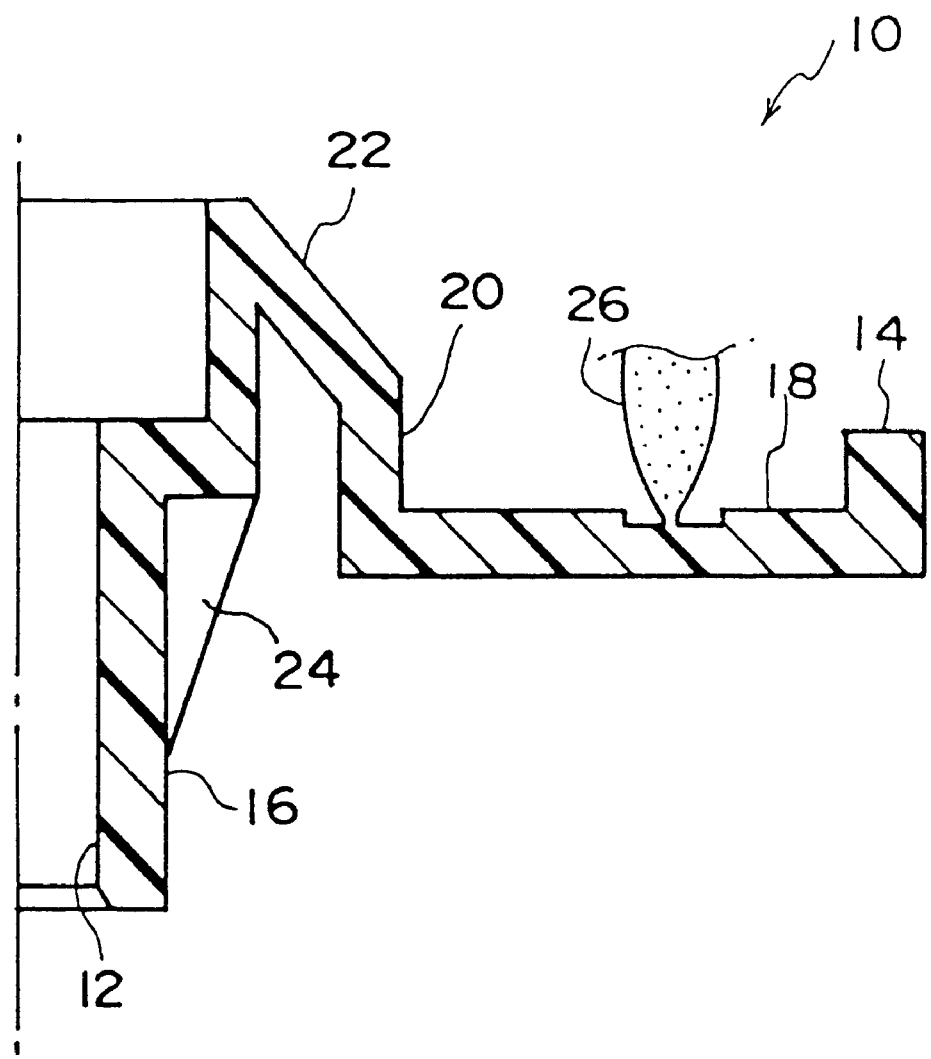
FIG. 16 is an enlarged cross-sectional view of a main portion which illustrates a center right portion of the conventional turntable when facing a longitudinal sectional surface thereof.

Next, a comparative example for clarifying the characteristics of the turntable made from polyacetal resin of the present invention will be described. The turntable 10 was formed in the configuration of the aforementioned conventional example shown in FIGS. 14 through 16 and was manufactured while the plastic material forming the turntable 10 is a polycarbonate resin. The relationship between pressing-in force, extracting force and changes in the rotational shaft diameter (shaft diameter) when the rotational shaft (shaft) of the spindle motor was fit into the insertion hole 12 of the boss portion 16 was measured.

The polycarbonate resin which is a material of the turntable in the comparative example is a trade name "Ice Color Grade L-1225Y" of Panlite (registered trademark) manufactured by Teijin Ltd. The resin is commercially available.

The relationship of pressing-in force (unit: kg), extracting force (unit: kg) to the rotational shaft (shaft) of each of the three spindle motors having different rotational shaft diameters (shaft diameters) was measured. The results shown in the following Table 4 were obtained.

TABLE 4

Relationship between Shaft Diameter of Turntable (Manufactured from Polycarbonate) and Pressing-in Force, Extracting Force

|  | Shaft diameter | Pressing-in force | Extracting force |
| --- | --- | --- | --- |
| 1 | 1.944 | 20.8 | 16.9 |
| 2 | 1.944 | 21.2 | 17.2 |
| 3 | 1.944 | 20.6 | 16.7 |
| 4 | 1.944 | 18.5 | 15.2 |
| 5 | 1.944 | 22.6 | 18.8 |
| 6 | 2.000 | 28.3 | 23.4 |
| 7 | 2.000 | 27.6 | 23.0 |
| 8 | 2.000 | 26.5 | 21.8 |
| 9 | 2.000 | 23.8 | 18.8 |
| 10 | 2.000 | 25.8 | 21.3 |
| 11 | 2.004 | 29.2 | 24.5 |
| 12 | 2.004 | 31.4 | 25.1 |
| 13 | 2.004 | 29.6 | 24.9 |
| 14 | 2.004 | 29.9 | 24.4 |
| 15 | 2.004 | 30.1 | 24.9 |

Figure 13:
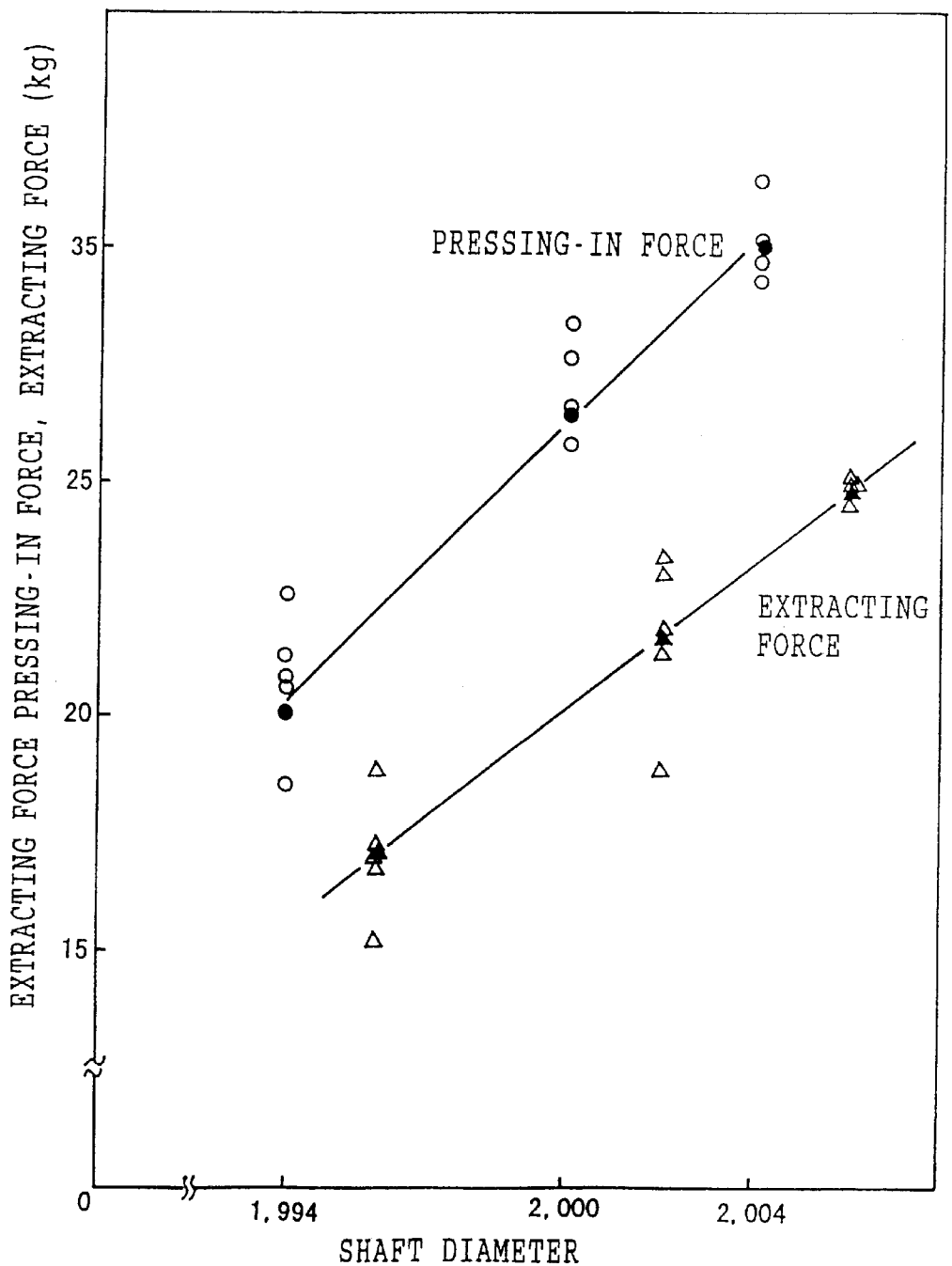
FIG. 13 is a graph showing a relationship of pressing-in force and extracting force to a polyacetal resin-made turntable in a comparative example.

The results of measurement in Table 4 are shown in a graph in FIG. 13. As is found from the graph, the rate of change in the pressing-in force with respect to the rotational shaft diameter (shaft diameter, unit: mm) and the rate of change in the extracting force (unit: kg) with respect to the rotational shaft diameter (shaft diameter) are as high as 1.3 kg/$\mu$m.

Accordingly, at the time of injection molding, sink or warpage is generated on the inner circumferential surface of the insertion hole 12 provided at the boss portion 16. If there are some error which changes the inner diameter of the insertion hole 12 or error which changes the roundness of the insertion hole 12, the error in the rotational shaft diameter (shaft diameter) or the like is added to the dimensional error in the insertion hole 12. As a result, changes in the pressing-in force and the extracting force increase and the extracting force is lower than a predetermined limit value of use. Thus, the turntable 10 which was fit with the rotational shaft of the spindle motor cannot sometimes withstand the use.

As a result, when the turntable 10 is manufactured from the polycarbonate resin, the injection molding must be carried out at high precision, precision of the mold is high, the management thereof is effected with care, and troublesome manufacturing operation for producing high precision must be done. Therefore, the manufacturing efficiency is comparatively low and the price of the product is high.

In accordance with the turntable and the disk driving device of the present invention, a superior effect is achieved in that a turntable having a predetermined quality can be manufactured easily and inexpensively by using a comparatively inexpensive material and further in accordance with ordinary injection molding technique and ordinary mold management.

Due to the aforementioned structure, the shaft supporting structural portion can be made thin. Accordingly, deformation due to sink or the like does not occur to the inner circumferential portion of the hole, which is formed at the shaft supporting structural portion and through which the rotational shaft is inserted, at the time of injection molding. Also, the extracting force of the rotational shaft which was fit into the hole, through which the rotational shaft is inserted, is adjusted to a predetermined value. Further, the extracting force with respect to the rotational shaft which was fit into the hole, through which the rotational shaft is inserted, can be improved by the reinforcing structure.

Due to the aforementioned structure, the fixing portion and the reinforcing portion can be formed thin. Consequently, when the entire table is subjected to injection molding, the turntable can be molded into a predetermined configuration at high precision in such a way that deformation due to sink or the like does not occur to the fling portion and the reinforcing portion.

Due to the aforementioned structure, the polyacetal resin has characteristics in which the radius of elasticity and the coefficient of friction are comparatively small. Accordingly, even if there are some changes in the surface roughness of the inner circumferential surface of the insertion hole which is formed at the fixing portion, changes in the inner diameter thereof, or changes in the roundness of the hole, and further, even if there is some error in the size of the diameter of the rotational shaft, the rate of changing the extracting force with respect to the rotational shaft which was pressed into the insertion hole can be reduced, and the predetermined value of extracting force can be set to, for example, 5 kg/$\mu$m or more which can withstand the use. Therefore, even when an error in the size of the diameter of the rotational shaft is predicted, the turntable which copes with the error can be manufactured easily and inexpensively in accordance with ordinary injection molding technique and ordinary mold management, and further, the product can be manufactured from a comparatively inexpensive material called polyacetal resin.

What is claimed is:

1. A turntable on which a disk is loaded, said turntable comprising:

a fixing portion into which a rotational shaft which rotates said turntable is pressed, said fixing portion being elastically deformable in a radial direction of said fixing portion;

a reinforcer which is provided at an outer circumference of said fixing portion, said reinforcer generating reaction force against elastic deformation of said fixing portion in the radial direction, wherein said reinforcer has a reinforcing portion, which is disposed such that a space is provided between said reinforcing portion and said fixing portion, and a connecting portion, which is formed from said fixing portion to said reinforcing portion, wherein said connecting portion is a plate-shaped member which is formed radially from said fixing portion to said reinforcing portion; and a reaction force applying portion which is provided at an outer circumference of said reinforcing portion substantially perpendicularly to said turntable, said reaction force applying portion generating reaction force which opposes a force by which said reinforcing portion is elastically deformed in the radial direction of said fixing portion.

2. A turntable according to claim 1, wherein said fixing portion and said reinforcing portion each have a thin-walled cylindrical configuration.

3. A turntable according to claim 2, wherein said turntable further includes a table portion, said fixing portion is provided at a central portion of said table portion, and said reinforcing portion has a diameter larger than the diameter of said fixing portion and is concentric with said fixing portion.

4. A turntable comprising:

a table portion on which a disk is loaded;

a shaft supporting structural portion, formed integrally with the central portion of said table portion and said shaft supporting structural portion having a reinforcing structure in which a plurality of thin plate portions intersect, said shaft supporting structural portion is provided substantially perpendicularly to said table portion at a central portion of said table portion in order to support a rotational shaft which rotates said turntable, wherein said turntable is formed by injection molding and, when said turntable is injection molded, a gate for an injection mold is disposed in a vicinity of said shaft supporting structural portion at the central portion of said table portion, wherein said shaft supporting structural portion further includes a thin-walled cylindrical-shaped fixing portion forming an insertion hole into which the rotational shaft is pressed; a thin-walled cylindrical-shaped reinforcing portion provided at an outer circumference side of said fixing portion, said reinforcing portion being concentric with said fixing portion and having a larger diameter than said fixing portion; and a reinforcing rib portion provided from said fixing portion to said reinforcing portion in a radial direction of said fixing portion.

5. A turntable according to claim 4, further comprising:

a reaction force applying portion which is provided at an outer circumference of said reinforcing portion substantially perpendicularly to said turntable, said reaction force applying portion generating reaction force which opposes a force by which said reinforcing portion is elastically deformed in the radial direction of said fixing portion.

6. A turntable according to claim 4, further comprising:

a portion which is formed integrally with said table portion such that said portion intersects the table portion in a manner in which a cross-sectional configuration of the integrally formed portion and the table portion is substantially cruciform.

7. A turntable according to claim 4, wherein said turntable is integrally formed by injection molding of a polyacetal resin having a composition such that extracting force of the rotational shaft when the rotational shaft has been pressed into said shaft supporting structural portion can be set to be at least a predetermined value.

8. A turntable, formed by injection molding, comprising:

a table portion on which a disk is loaded;

a thin-walled cylindrical-shaped outer cylindrical portion which is provided at a central portion of said table portion and which fits into an opening of the disk;

a thin-walled cylindrical-shaped inner cylindrical portion provided at an inner circumference side of said outer cylindrical portion, said inner cylindrical portion being concentric with said outer cylindrical portion and having a smaller diameter than said outer cylindrical portion;

a rib portion provided from said outer cylindrical portion to said inner cylindrical portion in a radial direction of said inner cylindrical portion; and a hole passing through the center of the turntable, into which hole a rotational shaft is pressed, and when said turntable is injection molded, a gate for an injection mold is disposed between said inner cylindrical portion and said hole at the central portion of said table portion.

9. A turntable according to claim 8, wherein said turntable is formed by injection molding, said turntable has a hole passing through the center of the turntable, into which hole a rotational shaft is pressed, and when said turntable is injection molded, a gate for an injection mold is disposed between said inner cylindrical portion and said hole at the central portion of said table portion.

10. A turntable according to claim 8, further comprising:

a portion which is formed integrally with said table portion such that said portion intersects the table portion in a manner in which a cross-sectional configuration of the integrally formed portion and the table portion is substantially cruciform.

11. A turntable according to claim 8, wherein said turntable is formed integrally by injection molding of a polyacetal resin having a composition such that extracting force of the rotational shaft when the rotational shaft has been pressed into the hole can be set to be at least a predetermined value.

12. A disk driving device comprising:

a rotational shaft which is connected to a spindle motor for driving to rotate a disk and which is driven to rotate by the spindle motor; and a turntable connected to said rotational shaft, on which turntable the disk is loaded, and which turntable rotates the disk, wherein said turntable includes:

a fixing portion for said rotational shaft, into which fixing portion said rotational shaft is pressed, said fixing portion being elastically deformable in a radial direction of the fixing portion; and a reinforcer for said fixing portion provided at an outer circumference of said fixing portion, said reinforcer generating reaction force against elastic deformation in the radial direction of said fixing portion, wherein said reinforcer has a reinforcing portion, which is disposed such that a space is provided between said fixing portion and said reinforcing portion, and a connecting portion, which is formed from said portion to said reinforcing portion, and said connecting portion is a plate-shaped member which is formed radially from said fixing portion to said reinforcing portion.

13. A disk driving device according to claim 12, wherein said turntable further includes a reaction force applying portion which is provided at an outer circumference of said reinforcing portion substantially perpendicular to said turntable, said reaction force applying portion generating reaction force which opposes a force by which said reinforcing portion is elastically deformed in the radial direction of said fixing portion.

* * * * *